United States Patent
Wang

(10) Patent No.: US 7,111,584 B2
(45) Date of Patent: Sep. 26, 2006

(54) KENNEL

(75) Inventor: Steve Wang, Long Grove, IL (US)

(73) Assignee: Midwset Air Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/717,092

(22) Filed: Nov. 19, 2003

(65) Prior Publication Data

US 2005/0115514 A1    Jun. 2, 2005

(51) Int. Cl.
*A01K 1/00* (2006.01)

(52) U.S. Cl. .................. 119/502; 119/452; 119/481

(58) Field of Classification Search ............ 119/459, 119/461, 472, 482, 499, 502, 452, 481; 256/24, 256/26, 73; 49/381, 400, 504
See application file for complete search history.

(56) References Cited

U.S. PATENT DOCUMENTS

| | | | | | |
|---|---|---|---|---|---|
| 2,741,391 | A | * | 4/1956 | Belanger | 220/6 |
| 3,072,385 | A | * | 1/1963 | Johnson | 256/25 |
| 3,469,822 | A | * | 9/1969 | O'Brien | 256/25 |
| 3,550,559 | A | * | 12/1970 | Long et al. | 119/502 |
| 3,604,685 | A | * | 9/1971 | Pokryfki | 256/25 |
| 4,422,622 | A | * | 12/1983 | Broski, Jr. | 119/502 |
| 4,696,259 | A | * | 9/1987 | Fewox | 119/482 |
| 4,819,582 | A | * | 4/1989 | Lichvar | 119/474 |
| 5,354,036 | A | | 10/1994 | Brown | 256/25 |
| 5,564,367 | A | * | 10/1996 | Boyanton | 119/474 |
| 5,727,502 | A | * | 3/1998 | Askins et al. | 119/499 |
| 5,943,982 | A | * | 8/1999 | Askins et al. | 119/499 |
| D415,842 | S | * | 10/1999 | Mishina | D25/39 |
| D422,088 | S | * | 3/2000 | Mishina | D25/39 |
| D422,367 | S | * | 4/2000 | Mishina | D25/38 |
| 6,457,438 | B1 | | 10/2002 | Baker | 119/498 |
| 6,553,940 | B1 | | 4/2003 | Powell et al. | 119/514 |
| 6,571,740 | B1 | | 6/2003 | Kinder et al. | 119/497 |
| 2003/0145799 | A1 | * | 8/2003 | Hays et al. | 119/502 |

* cited by examiner

*Primary Examiner*—Michael J. Carone
*Assistant Examiner*—Bret Hayes
(74) *Attorney, Agent, or Firm*—Greer, Burns & Crain, Ltd.

(57) ABSTRACT

A kennel includes a plurality of side panels that are connected or coupled together with a gate panel to form an enclosure. The gate panel has a pair of ends that are configured for connecting to the side panels and allow access into and out of the enclosure via a doorway positioned between the ends. A door configured for opening and closing the doorway is positioned therein, and has a frame member directly and rotatably attached to a doorway frame member to form a compact door and doorway combination in the gate panel.

13 Claims, 6 Drawing Sheets

KENNEL

BACKGROUND OF THE INVENTION

The present invention relates generally to kennels, and more specifically to an animal kennel having a compact door and doorway configuration.

Animal kennels are known in the art. Such kennels can be relatively small and portable enabling users to carry an assembled kennel in a vehicle or the like, or generally larger, which requires the kennel to be disassembled during transportation and assembled once a destination is reached. Many users of kennels have concerns about storing animals in smaller kennels, and prefer using larger kennels because of increased sanitation and space.

Larger kennels basically can be formed using a series of panels that are connected or coupled together to form an enclosure. FIG. 1 is exemplary of such a typical prior art kennel, which is generally designated as 10. The kennel 10 includes a plurality of side panels 12 that are configured for coupling to one another, and a gate panel 14 that connects to the side panels at corners 16. An enclosure, generally designated as 18, is formed by the connecting of the side panels 12 and the gate panel 14 together.

Generally, it is desirable to be able to quickly assemble larger kennels since they are often used as portable kennels. Accordingly, many larger kennels are designed to have a skeleton structure that is formed by a plurality of vertical frame members 20 that slidingly interlock with horizontal frame members 22 at junctions 24. That is, the vertical frame members 20 and horizontal frame members 22 are assembled by slidingly coupling in a friction fit to one another to form the skeleton structure of the kennel 10.

After assembly of the skeleton structure of the kennel 10, the vertical frame members 20 and the horizontal frame members 22 that form the gate panel 14 are arranged to form a doorway, generally designated as 26. The doorway 26 is surrounded by vertical doorway frame members 28 and horizontal doorway frame members 30 that connect to one another. Typically, a section of wire cloth 31 or other barrier is attached to the vertical doorway frame members 28 using vertical posts 34 that are passed through loops in the wire cloth. Another length of wire cloth 35 is attached to one or more of the vertical frame members 20 to seal the enclosure 18. The vertical posts 34 are secured by clamps 36 to the vertical frame members 20, and prevent escape of an animal from the enclosure 18 through the doorway 26 when closed.

A door 38 is provided for closing the doorway 26, and is defined by the vertical doorway frame members 28, the horizontal doorway frame members 30, and the wire cloth 31. Typically, the door 38 uses hinges 40 to achieve rotation about one of the vertical frame members 20. In addition, the door 38 usually has a locking mechanism 42 attached to a vertical doorway frame member 28 that engages one of the vertical frame members 20 to maintain the door 38 in a closed position. When the locking mechanism 42 is released, the door 38 is rotatable from the closed position, as shown in FIG. 1, to an open position (not shown) permitting entry into and out of the enclosure 18.

While the use of hinges to rotate kennel doors is known in the art, hinges have a number of drawbacks and disadvantages. One of the principle disadvantages is that repeated connection of the hinges to the vertical frame member when assembling the kennel can be difficult, especially since the hinges need to be positioned at certain locations on a vertical frame member. Since these portable kennels are often assembled and disassembled, adjusting the position of the hinges can become tedious and labor intensive. Another disadvantage is that hinges may malfunction over time due to stress upon the hinges caused by their support of the door. Another design factor of such portable kennels is a desire to reduce the disassembled weight while maintaining the size and structural strength. Therefore, there has been and continues to be a need for a larger kennel that is portable, can be quickly and easily assembled, has a sturdy structure for enabling rotation of a door, and that can withstand stress exerted on the structure by the door.

SUMMARY OF THE INVENTION

To overcome the foregoing problems, the present invention provides a kennel having a door and door frame that share a common vertical frame member, which improves the rotational structure of the door, and can be rapidly assembled and disassembled without using separate hinges or a similar structure.

The present kennel has a plurality of side panels configured for coupling to one another and a gate panel to form an enclosure. A doorway formed in the gate panel has at least one doorway frame member, and is positioned between ends of the gate panel to allow for opening and closing of a door positioned in the doorway. A feature of the present door is that it has a structure for rotating the door between an open and closed position without using hinges. More specifically, the door has at least one door frame member directly and rotatably attached to a doorway frame member, which provides a sturdy structural connection between the door and door frame of the gate panel.

DETAILED DESCRIPTION OF THE INVENTION

Figure 1:
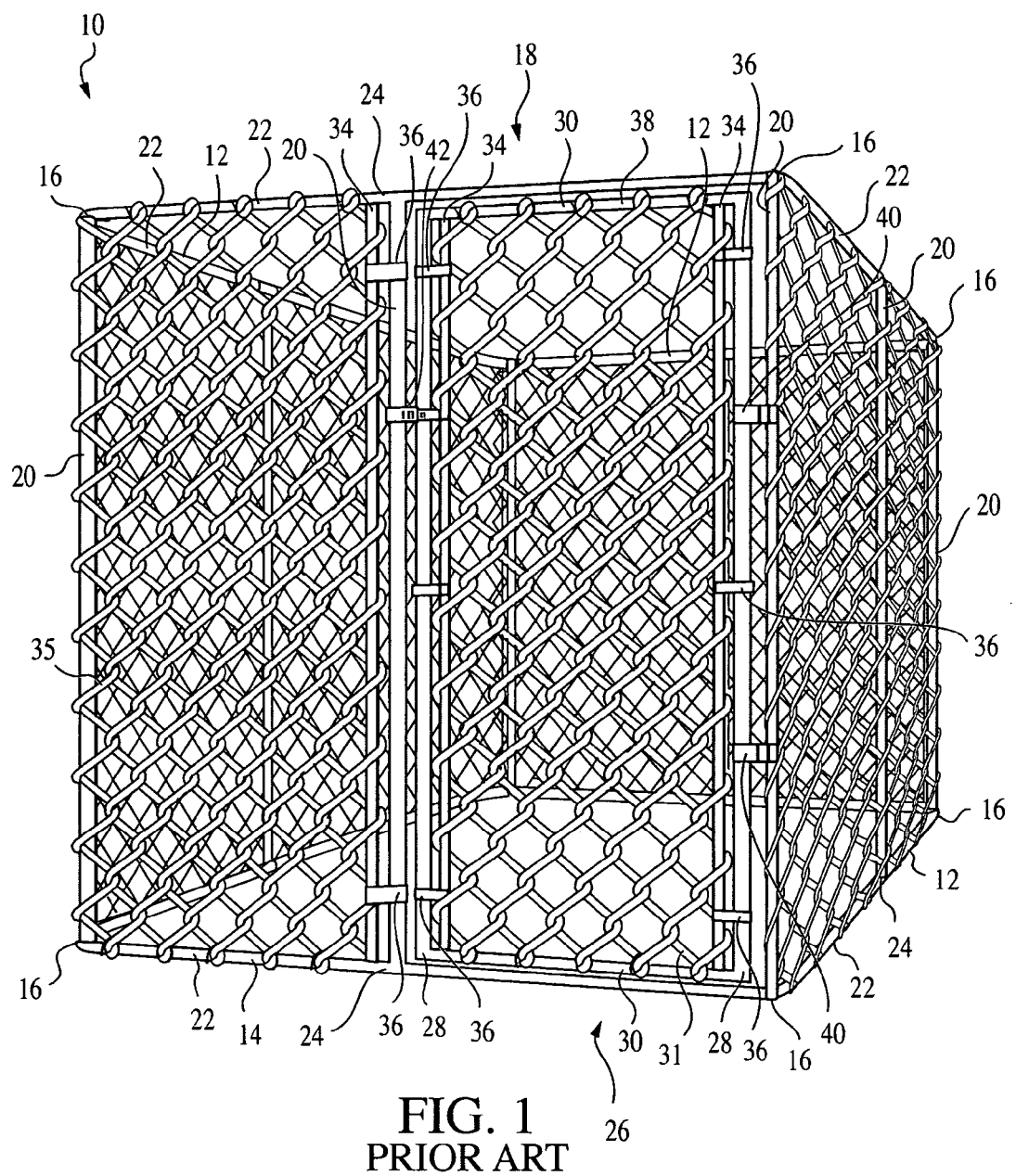
FIG. 1 is a perspective view of a prior art assembled kennel having a hinged door connected to a frame member of a doorway.
Figure 2:
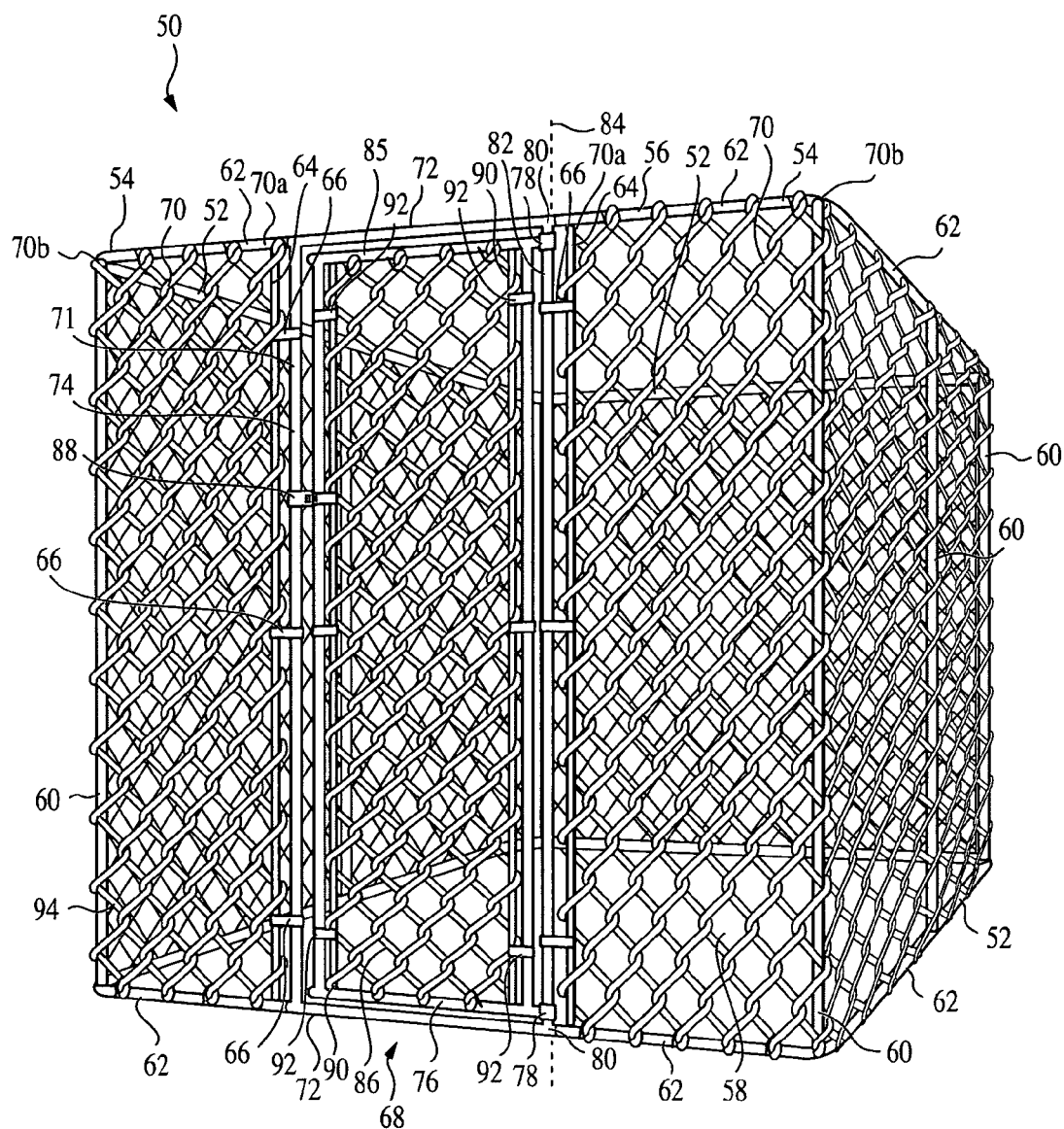
FIG. 2 is a perspective view of an assembled kennel according to one embodiment of the present invention.

Referring now to FIG. 2, a kennel is generally designated as 50, and includes a plurality of side panels 52 configured for coupling to one another and connected to ends 54 of a gate panel 56. The side panels 52 and the gate panel 56 form an enclosure 58 for kenneling an animal, such as a dog or the like.

As in the prior art kennel 10, the side panels 52 and the gate panel 56 are generally formed using vertical frame members 60 and horizontal frame members 62 that connect together to form a skeleton structure. Known methods of fastening frame members together can be implemented, however it is generally preferred for ease in assembly that the frame members slidingly and matingly engage each other. That is, one end of a frame member has an outer diameter slightly less than an inner diameter of a complementary end of a joining frame member, to enable a frictional fit.

Also, similar to the prior art kennel 10, the gate panel 56 includes vertical posts 64 that are secured via clamps 66 to a doorway, generally designated as 68, which is positioned between the ends 54 of the gate panel. In the preferred embodiment, the doorway 68 is centrally located, however other orientations are contemplated. The gate panel 56 also has one or more barrier panels 70 that prevent access into or out of the enclosure 58. In the preferred embodiment, each of the barrier panels 70 is formed by a continuous web or roll of wire cloth such as used in chain link fences. The roll is wrapped about the framework defined by the panels 52, 56. However, other types of barrier materials are contemplated. In addition, discontinuous wire cloth sections that are attached between each of the vertical frame members 60 are contemplated. The barrier panels 70 each have an end 70*a* connected to the doorway 68 and another end 70*b* connected to one of the side panels 52. A generally rectangular frame that includes a C-shaped frame member 71 defines the doorway 68. A pair of horizontal doorway frame members 72 and a vertical doorway frame member 74 forms the C-shaped frame member 71.

Figure 3:
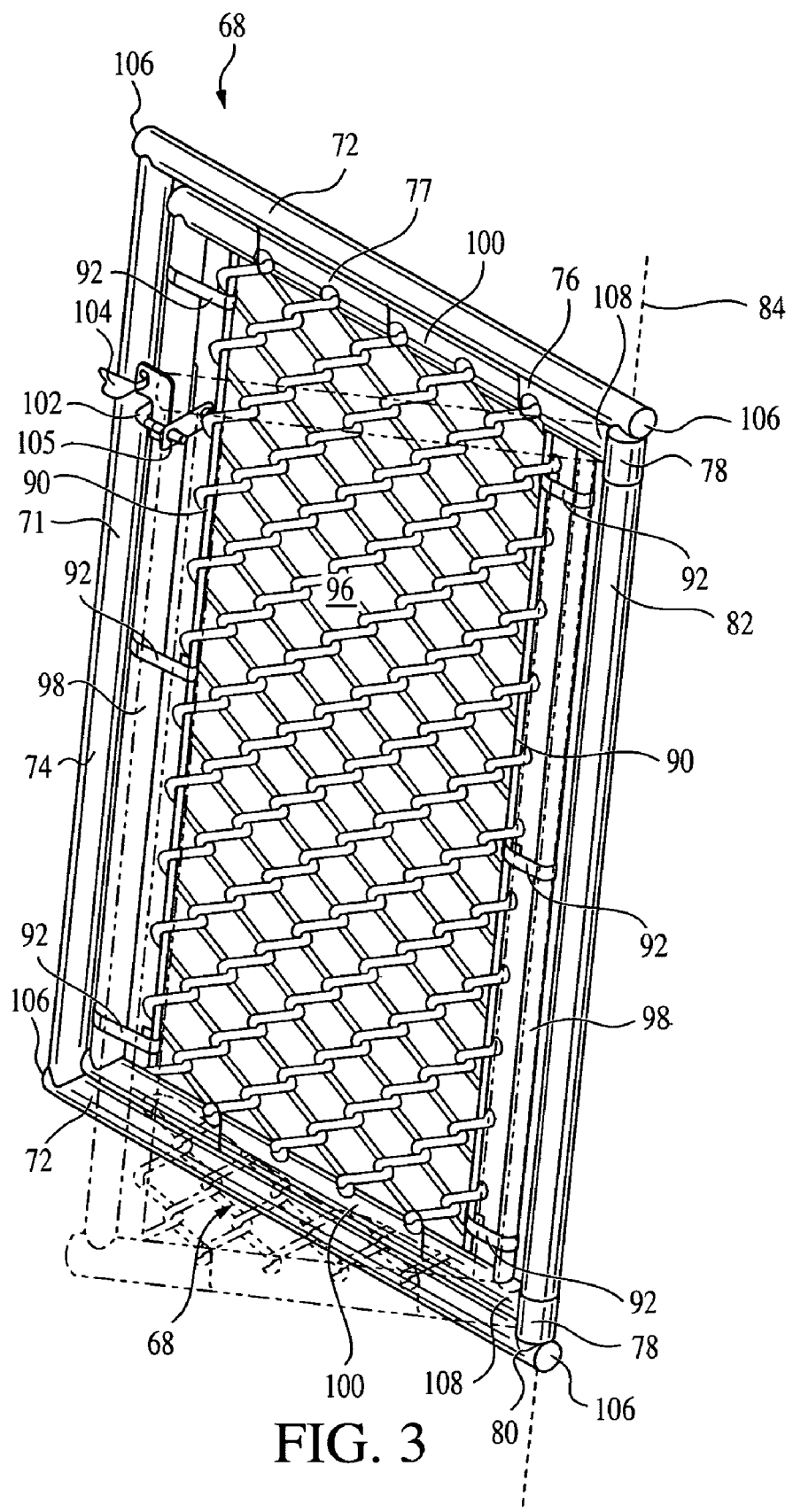
FIG. 3 is a perspective view of the door and doorway of FIG. 2 having a latch-type locking mechanism.

Referring now to FIGS. 2 and 3, a door 76 is positioned in the doorway 68 and connects via secure, sleeve-like fittings 78 at elbows 80 of a vertical doorway frame member 82. Preferably, the secure fittings 78 encircle at least a portion of the vertical doorway frame member 82 to facilitate rotation of the door 76 around a central cylindrical axis 84 defined by the vertical doorway frame member 82. The door 76 has a generally rectangular frame 85 and includes a barricade, such as a wire cloth 86, which prevents an animal or the like from escaping from the enclosure 58 when the door 76 is in a closed position as shown in FIG. 2. The door 76 is configured for opening and closing the doorway 68 via rotation of the door using the secure fittings 78. A locking mechanism, such as a flip-type lock 88 (FIG. 2) prevents opening of the door 76 when the lock engages the vertical doorway frame member 74 of the C-shaped frame member 71.

In the embodiment shown in FIG. 2, vertical posts 90 at respective ends of the wire cloth 86 pass through the cloth and are attached to the C-shaped frame member 71 and the vertical doorway frame member 82 by doorway clamps 92. A continuous web or roll of wire cloth 94 connects to the vertical posts 64 to seal the side panels 52 and the gate panel 56. Thus, the barrier panels 70 are formed using the pair of vertical frame members 60, the horizontal frame members 62, and a section of the wire cloth 94. While the wire cloths 86 and 94 are used to close off the enclosure 58, one skilled in the art realizes that other known materials for blocking access, including solid panels, can be utilized for the barrier panels 70, the side panels 52, and the gate panel 56 to form the enclosure 58 and prevent access into and out of the enclosure.

Turning now to FIG. 3, the C-shaped frame member 71, the door 76, and the vertical frame member 82 are shown formed as an integral unit with the door in a closed position and an open position (in phantom). A central region 96 of the doorway 68 is defined by a pair of elongated vertical frame members 98 integrally formed with a pair of horizontal cross-frame members 100. The door 76 has the horizontal cross-frame members 100 directly and rotatably attached to the vertical doorway frame members 82. A locking mechanism, such as a latch-type lock 102, has a pair of pivoting flap-like elements 104 releasably engaging the vertical doorway frame member 74, and are connected to a bracket 105 connected as with a "U"-bolt, to one of the elongated vertical frame members 98 to facilitate latching of the door 76. The vertical posts 90 are connected to the elongated vertical frame members 98 via the doorway clamps 92, which are generally C-shaped. However, alternative known fastening methods, such as wire ties, may be used as is known to those skilled in the art.

The sleeve-like secure fittings 78 are integrally formed at ends 108 of the horizontal frame members 100 and at least partially encircle a corresponding one of the vertical doorway frame members 82 to permit rotation of the door 76 about the central cylindrical axis 84 without using separate hinges or similar structure. An advantage of this configuration is that the kennel 50 can be assembled more quickly, since frame members of the skeleton structure are slidingly attached by a frictional fit at junctions 106. Moreover, due to their construction, the secure fittings 78 form a sturdy structure that is less likely to malfunction, in comparison to conventional hinges that are attached and removed from the vertical doorway frame member during disassembly and assembly of the kennel 50. Preferably, the secure fittings 78 are formed as sleeve members that are directly attached to and encircle the vertical doorway frame member 82. While the secure fittings 78 are shown integrated as unitary units with the horizontal cross-frame members 100, it is contemplated that the secure fittings can be formed as separate components connectable to the horizontal cross-frame members.

Figure 4:
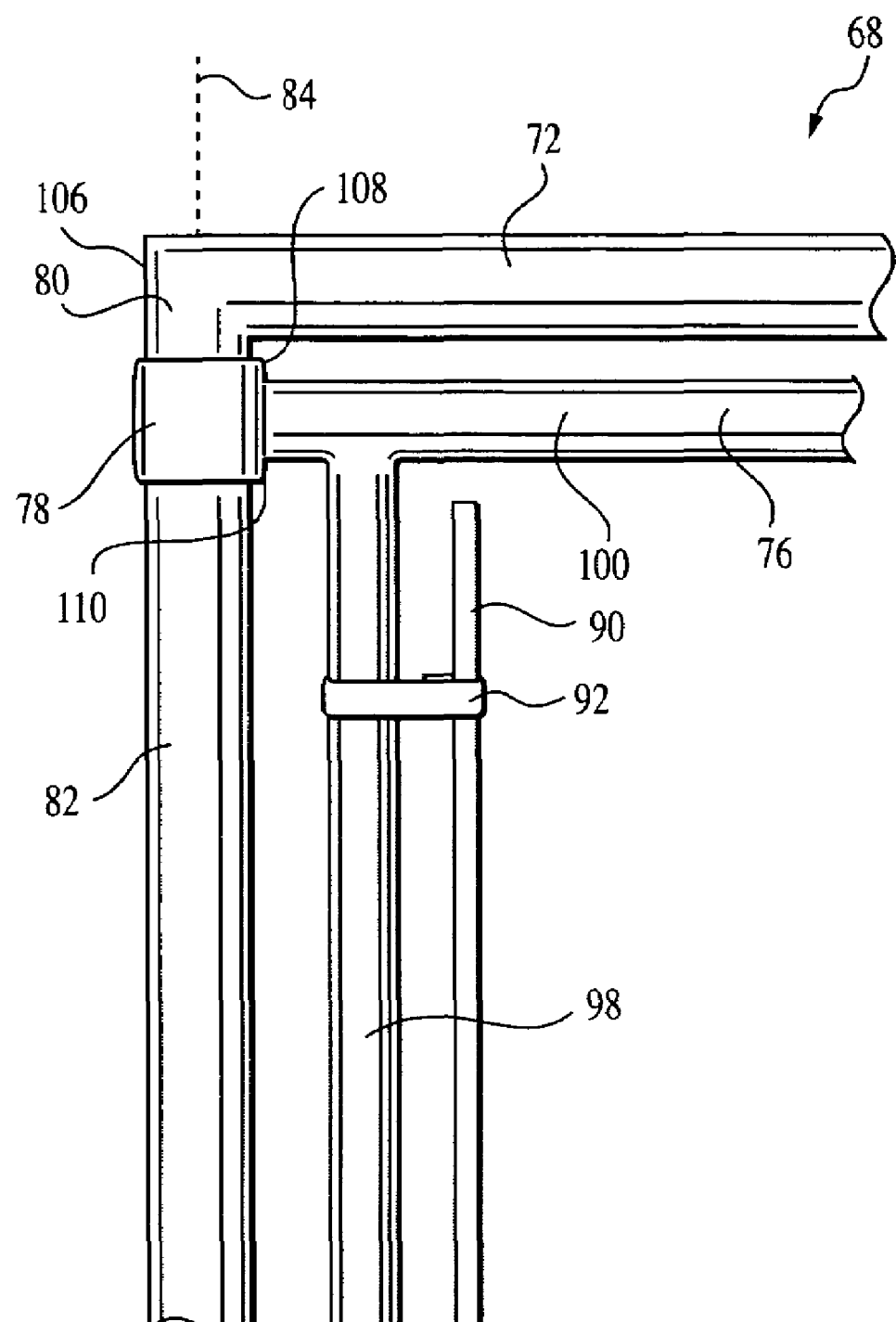
FIG. 4 is a fragmentary elevated view of the door and doorway of FIG. 3.
Figure 5:
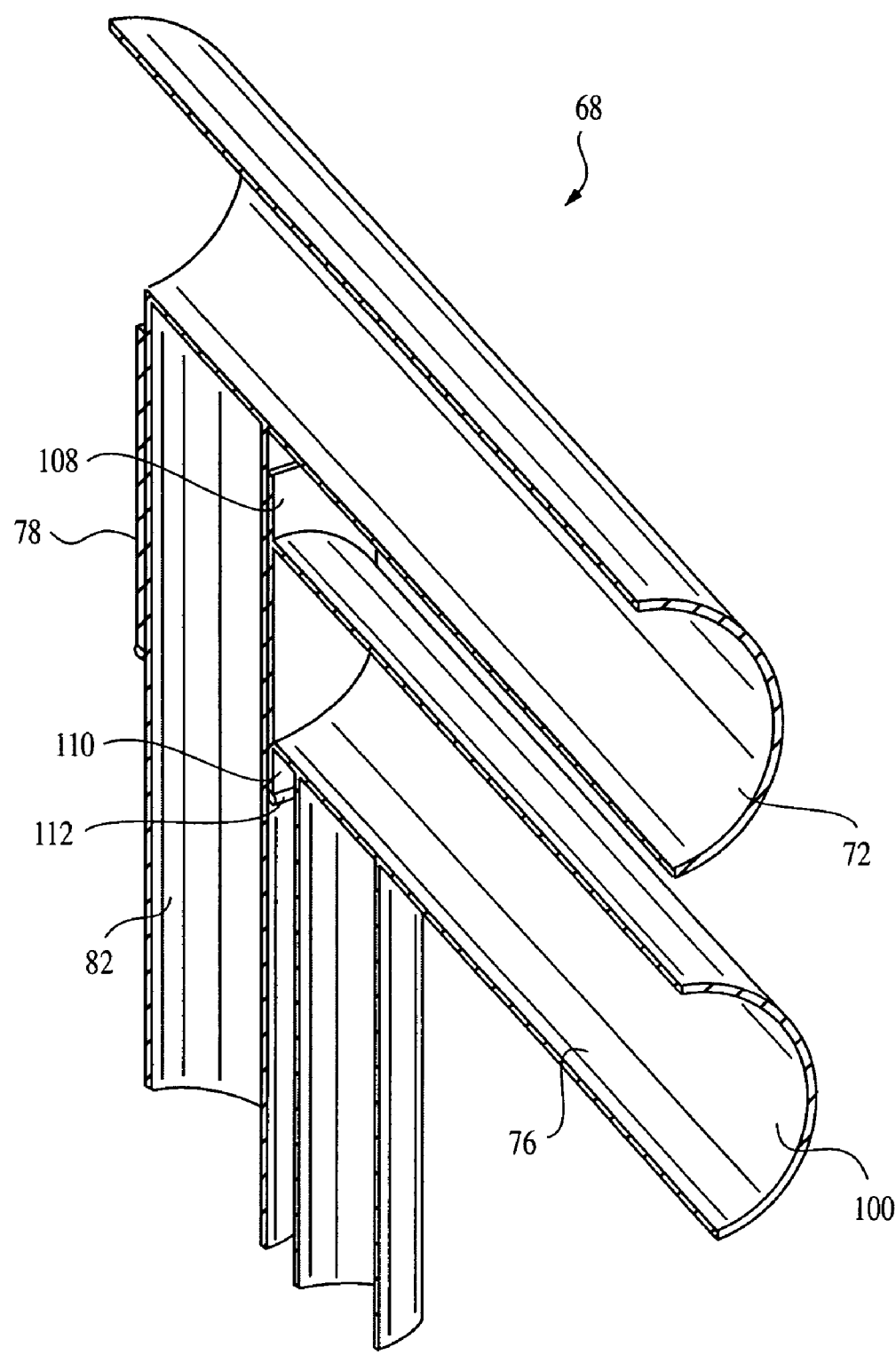
FIG. 5 is a fragmentary sectional perspective view of a secure fitting connecting the door to a frame member of the doorway.

Referring now to FIGS. 4 and 5, in which a corner portion of the doorway 68 of FIG. 3 is shown, each of the secure fittings 78 (one shown in FIGS. 4 and 5) is formed as a sleeve member that rotatably receives the vertical doorway frame member 82, and also has an upper end 108 and a lower end 110 that rotate with the door 76 about the central cylindrical axis 84. Preferably, the upper end 108 does not contact the horizontal doorway frame member 72 to minimize frictional resistance to rotation. However, the lower end 110 may contact the horizontal doorway frame member 72 while rotating with the door 76. Alternatively, the vertical doorway frame member 82 can include one or more annular or semi-annular ridges 112 (one shown in FIG. 5) that engage the lower end 110 to rotatably fix the position of the secure fitting 78 on the vertical doorway frame member 82 without the lower end 110 contacting the horizontal doorway frame member 72.

Figure 6:
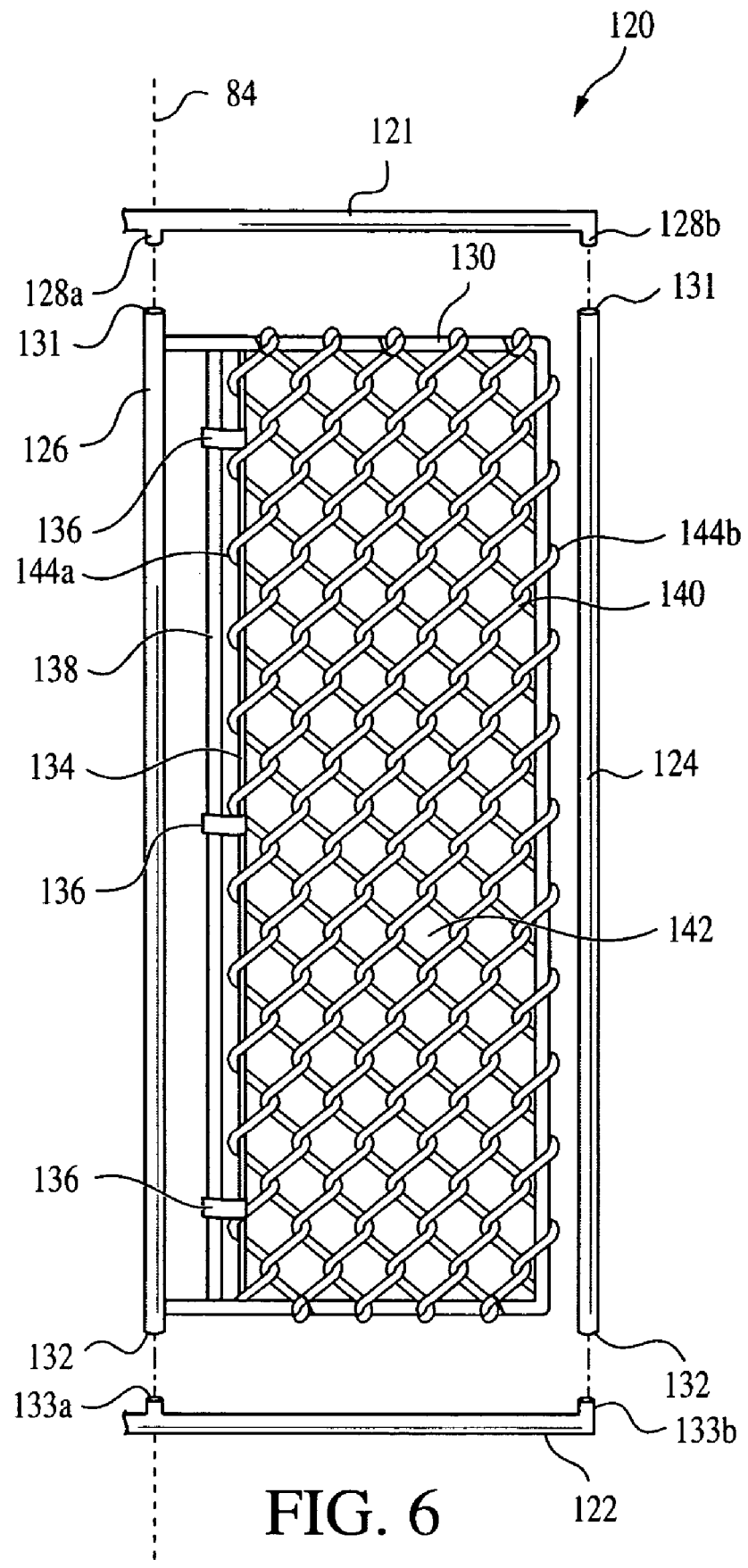
FIG. 6 is an exploded view of an alternative embodiment of a secure fitting for a door positioned in a doorway.

Referring now to FIG. 6, an exploded view of an alternative embodiment doorway is generally designated as 120. In this embodiment, an upper frame member 121, a lower frame member 122, an elongated vertical frame member 124, and another elongated vertical frame member 126 define the doorway 120. The upper frame member 121 has first and second bosses 128*a* and 128*b*, which are configured to frictionally and slidingly engage elongated vertical frame members 124 and 126. In this manner, the upper frame member 121 and the lower frame member 122 are both configured for being slidingly engaged on a door 130. Depending on the application, either the bosses 128*a, b* or the frame members 124, 126 may have the larger diameter. An advantage of this arrangement is that the door 130, which is positioned in the doorway 120, shares a common elongated vertical frame member 126 with the doorway. Accordingly, less material to form a door and doorway combination is required using this arrangement versus conventional kennel gates that implement hinge designs.

In one alternative embodiment, upper ends 131 of the vertical frame members 124, 126 may slide within the first and second bosses 128a and 128b to prevent moisture from entering at the connection points. However, the junctions at the lower ends 132 and first and second bosses 133a and 133b of the lower frame member 122 preferably remain as previously configured such that the first and second bosses of the lower frame member are secured within the vertical frame members 124 and 126, which prevent moisture from entering the lower-end junctions.

Similar to the embodiments of FIGS. 2–5, the present door 130 includes a fastener such as a vertical post 134, clamps 136, and a vertical frame member 138 that secures a barrier such as a wire cloth 140 in a central region 142 of the door. The wire cloth 140 includes a pair of ends 144a and 144b that connect to the door 130. The fastener 134 is attached to the end 144a and passes through loops in the wire cloth 140. The clamps 136 attach to the fastener 134 and the vertical frame member 82. However, it is contemplated that the vertical frame member 138 may be removed and that the clamps 136 are configured to instead directly engage the common elongated vertical frame member 126, which reduces material cost for forming the door 130.

The present invention has advantages over conventional kennels that implement hinged-door assemblies. A feature of the present invention is that a vertical door frame member and a vertical doorway frame member and a vertical doorway frame member are shared. This enables less material to be used to form the gate panel, and also results in a lighter gate panel. In addition, the door of the present invention is designed to directly engage the door frame without the use of hinges or a similar structure. Accordingly, the door and door frame are sturdy and can be quickly and easily assembled and/or disassembled, since no hinges are required to attach the door to the door frame.

While particular embodiments of a door positioned in a doorway of a gate panel of a kennel have been disclosed, it will be appreciated by those skilled in the art that changes and modifications may be made thereto without departing from the invention in its broader aspects and as set forth in the following claims.

What is claimed is:

1. A kennel comprising:
a plurality of side panels configured for coupling to one another; and
a gate panel comprising:
a pair of ends, each of said ends configured for connecting to said side panels to form an enclosure;
a doorway positioned between said ends and defined by at least one doorway frame member having at least one boss formed therewith;
a door configured for opening and closing said doorway and having at least one door frame member directly and rotatably attached to said boss of said doorway frame member; and
wherein said doorway includes an upper frame member and a lower frame member, both configured for being slidingly engaged on said door.

2. The kennel of claim 1, wherein said door includes a secure fitting directly connecting said door frame member to said doorway frame member.

3. The kennel of claim 2, wherein said secure fitting encircles at least a portion of said doorway frame member to facilitate rotation of said door about a central cylindrical axis defined by said doorway frame member.

4. A kennel comprising:
a plurality of side panels configured for coupling to one another; and
a gate panel comprising:
a pair of ends, each of said ends configured for connecting to said side panels to form an enclosure;
a doorway positioned between said ends and defined by at least one doorway frame member having at least one boss formed therewith;
a door configured for opening and closing said doorway and having at least one door frame member directly and rotatably attached to said boss of said doorway frame member;
wherein said door includes a secure fitting directly connecting said door frame member to said doorway frame member; and
wherein said at least one door frame member includes a horizontal member having an end provided with said secure fitting.

5. A kennel comprising:
a plurality of side panels configured for coupling to one another; and
a gate panel comprising:
a pair of ends, each of said ends configured for connecting to said side panels to form an enclosure;
a doorway positioned between said ends and defined by at least one doorway frame member having at least one boss formed therewith;
a door configured for opening and closing said doorway and having at least one door frame member directly and rotatably attached to said boss of said doorway frame member;
wherein said door includes a secure fitting directly connecting said door frame member to said doorway frame member; and
wherein said secure fitting comprises a sleeve-like member having an inner portion configured for receiving a vertical frame member.

6. The kennel of claim 1, wherein said at least one door frame member comprises a pair of horizontal members each having a secure fitting configured for receiving said door and rotating between a closed position and an open position.

7. A kennel comprising:
a plurality of side panels configured for coupling to one another; and
a gate panel comprising:
a pair of ends, each of said ends configured for connecting to said side panels to form an enclosure;
a doorway positioned between said ends and defined by at least one doorway frame member having at least one boss formed therewith;
a door configured for opening and closing said doorway and having at least one door frame member directly and rotatably attached to said boss of said doorway frame member;
wherein said doorway comprises:
a pair of elongated vertical frame members;
a pair of horizontal frame members connected to said vertical frame members to define a central region; and
a barrier positioned in said central region and connected to said horizontal and vertical frame members.

8. The kennel of claim 7, wherein said barrier is wire cloth.

9. The kennel of claim 1, wherein said doorway and said door are integrally formed.

10. A kennel comprising:
a plurality of side panels configured for coupling to one another; and a gate panel comprising:

a pair of ends, each of said ends configured for connecting to said side panels to form an enclosure;

a doorway positioned between said ends and defined by at least one doorway frame member; and a door configured for opening and closing said doorway and having at least one door frame member directly and rotatably attached to said doorway frame member, wherein said doorway includes an upper frame member and a lower frame member both configured for being slidingly engaged on said door, and wherein said lower and upper frame members each have first and second bosses having inner diameters and configured for engaging a pair of said doorway frame members such that said inner diameters of said first and second bosses of said upper frame member are greater than said inner diameters of said first and second bosses of said lower frame member.

11. A door for a gate panel of a kennel, comprising:

a barrier;

a first elongated door frame member having a central cylindrical axis and connected to said barrier; and at least two door cross-frame members each connected to first and second barrier securing frame members, and wherein said first elongated door frame member rotates about said central cylindrical axis, wherein said barrier comprises:

a wire cloth having at least two ends;

a fastener attached to one of the ends of said wire cloth; and a plurality of clamps connecting said fastener to said first barrier securing frame member.

12. The door of claim 11, wherein said first elongated door frame member is configured to rotate about said central cylindrical axis between a closed position and an open position.

13. The door of claim 11, wherein said door cross-frame members each include a pair of bosses configured for engaging said first elongated doorway frame member.

* * * * *